June 12, 1951
W. D. SMITHSON
2,556,781
FRAMING INSTRUMENT
Filed April 27, 1946
2 Sheets-Sheet 1
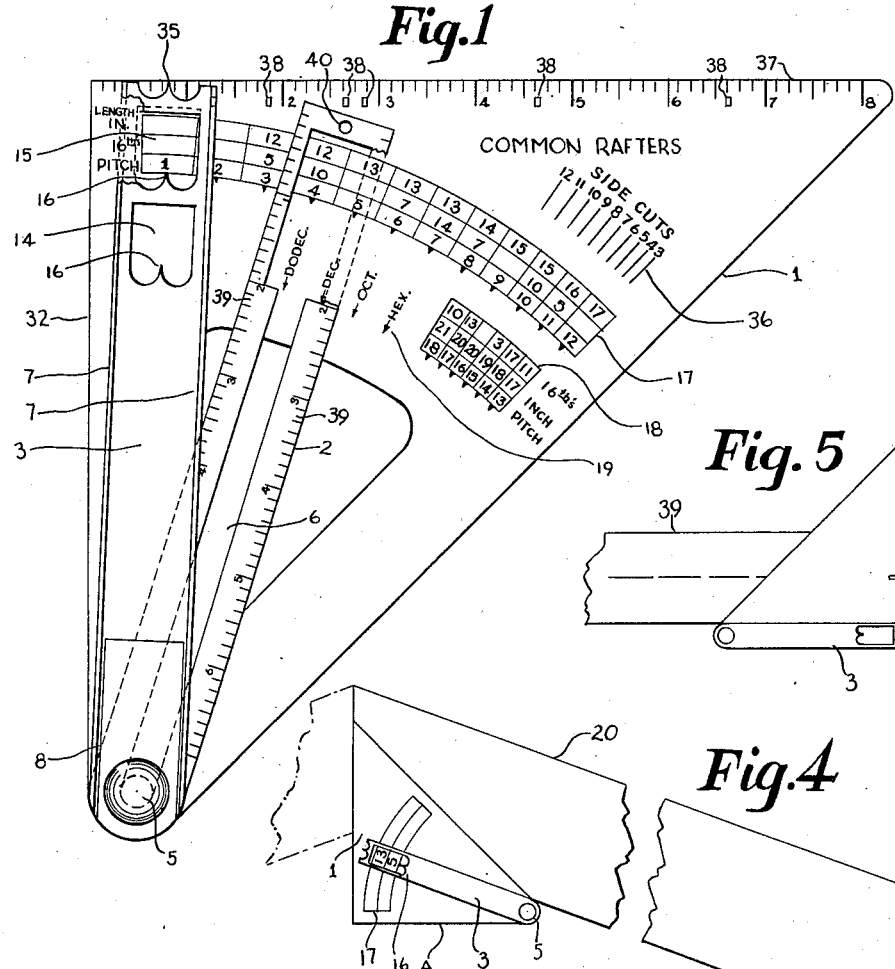
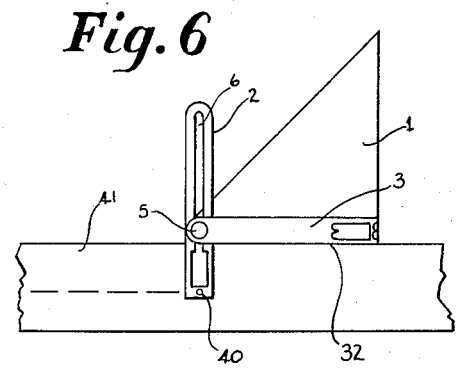
William D. Smithson
INVENTOR.
BY Wayland D. Keith
HIS AGENT.

June 12, 1951  W. D. SMITHSON  2,556,781
FRAMING INSTRUMENT
Filed April 27, 1946  2 Sheets-Sheet 2
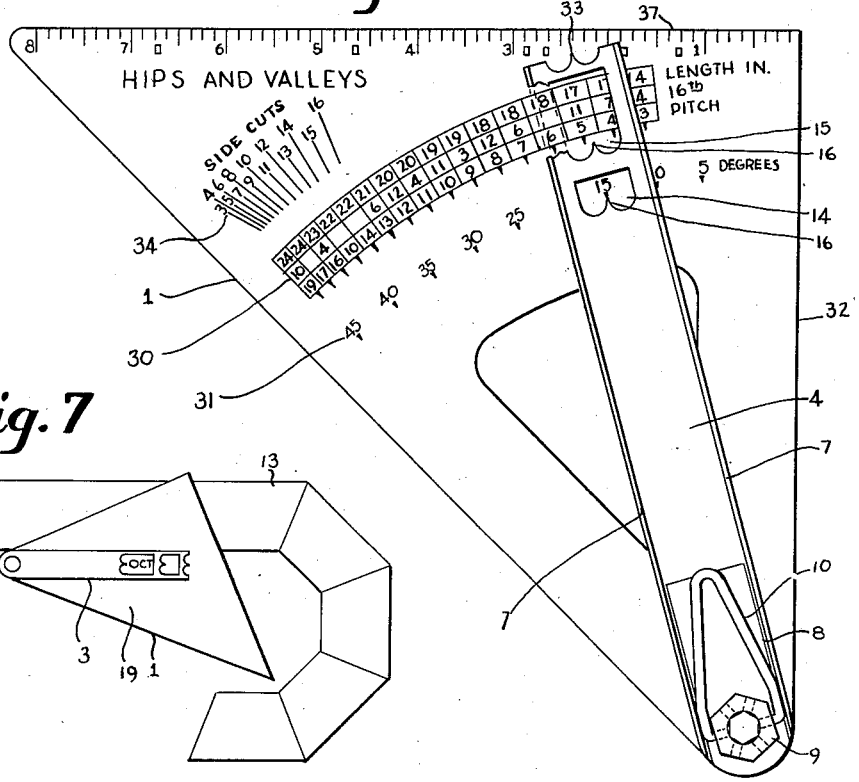
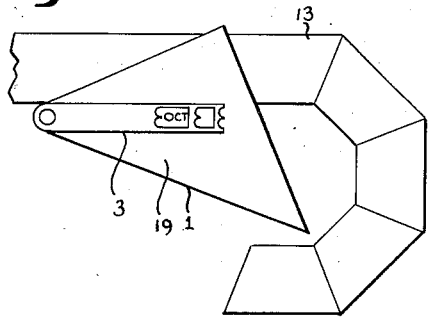
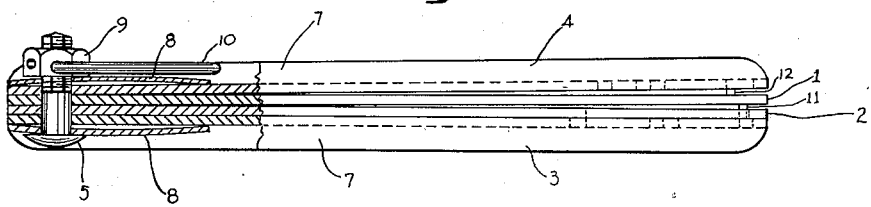
William D. Smithson
INVENTOR.
BY Wayland D. Keith
HIS AGENT.

Patented June 12, 1951

2,556,781

UNITED STATES PATENT OFFICE 2,556,781

FRAMING INSTRUMENT

William D. Smithson, Wichita Falls, Tex.

Application April 27, 1946, Serial No. 665,441

2 Claims. (Cl. 33—93)

This invention relates to an improved instrument for determining angles and complementary angles in laying out rafters, polygons and the like, and for performing other useful calculations in the carpenter's trade or in other trades requiring similar calculations and measurements.

The primary object of this invention is to provide an instrument whereby a carpenter or other artisan can, by simple adjustments of the instrument, secure a predetermined angle for cutting lumber and the like, and can by securing the instrument in adjusted positions, duplicate the cutting angle any number of times without readjustment of the instrument.

A further object of the invention is to provide an instrument which provides data for determining lengths of rafters and the like without the necessity of making complicated calculations as has been the usual practice in the trade.

Another object of this invention is to provide an instrument which is convenient in size and suitable for carrying in an artisan's tool chest.

Another object of this invention is to provide an instrument which is so simple to use that no prolonged instruction is required for the average artisan to use it accurately and efficiently.

A further object of this invention is to provide an instrument which may be adjusted to perform various functions in laying out, marking, and reading various angles and polygon cuts in degrees, such as are used by carpenters and others using similar measurements and calculations.

While, for purposes of illustration, the instrument is described in detail as applied to the carpenter's trade, it is to be understood that the usefulness of the instrument is not limited to that trade. It is also useful in sheet metal work, the working of plastic or glass, and in making drawings and the like requiring similar measurements and mathematical calculations.

The improved instrument in accordance with this invention will now be described with particular reference to the accompanying drawings. In the drawings, wherein the reference symbols refer to like parts wherever they are shown, there is illustrated a preferred embodiment of my invention. In the drawings:

Figure 1 is a plan view of the side of the instrument in accordance with my invention which carries scales for use in determining the angularity of cut for common rafters, with portions of the arms broken away to show the full scales.

Figure 2 is a plan view of the opposite side of the instrument to that shown in Figure 1 and which carries scales for determining the angularity of cut for hip and valley rafters with a portion of the arm broken away to show the full scales appearing on this side of the instrument.

Figure 3 is a side elevation of the instrument with parts broken away to show the details of construction.

Figure 4 is a view illustrating the use of the instrument for determining the angularity of cut of a common rafter.

Figure 5 and Figure 6 illustrate different methods of using the instrument as a scribe.

Figure 7 illustrates the use of the instrument to lay out polygon cuts.

With more detailed reference to the drawings particularly Figures 1, 2, and 3, the numeral 1 designates the triangular base of the instrument which is in the form of a flat sheet of any suitable material such as metal or a plastic that is suitable for the particular job for which the instrument is to be used. Each face of the triangular base member 1 is provided with various graduated scales as illustrated in Figures 1 and 2 which will be fully described hereinafter in connection with various illustrative uses of the instrument.

The triangular base member 1 carries two arms, 2 and 3 positioned on one side thereof, and an arm 4 positioned on its opposite side. The base triangle 1 is provided with a hole within one of the smaller angles of the base and opposite the scales appearing on each face. Each of the arms 2 and 3 are provided with holes of the same size positioned near one end of each of the arms. The bolt 5 aligns and passes through the said hole in the base triangle 1 and the holes in the arms 2 and 3 so that the said arms are pivotally mounted on the base triangle 1 and are adjustable with respect thereto and with respect to each other. The hole in arm 2 through which the bolt 5 passes is elongated in the form of a slot 6 running the length of the arm 2 which allows the arm 2 to slide lengthwise with respect to the bolt 5.

The arm 4 is provided with a hexagonal hole which is adapted to fit a hexagonal section just below the threads of the bolt 5. The hexagonal hole in arm 4 is so positioned that the arm 4 is aligned with the arms 2 and 3 when all of the arms are positioned on the bolt 5. When so positioned the arm 4, unlike arms 2 and 3, is rigidly attached to the bolt 5. The arms 3 and 4 are provided with flanges 7, 7, 7, and 7 along each edge which provide bearing surfaces which can be placed along the edge of a timber when the instrument is in use to determine the angle of a cut of the timber.

Two spring tension members 8, 8 having holes near one end are positioned on the outer sides of the arms 3 and 4 and extend a short distance along each of these arms. The bolt 5 carries a hexagonal nut 9. Each of the six facets of the nut forming the hexagon caries a hole providing a means for demountably attaching a clip member 10. The nut 9 is screwed onto the bolt 5 to secure a desired tension on the spring tension members 8, 8 and, in turn, on the arms 2, 3, and 5. This bolt is then locked in place by swinging the clip member 10 downwardly into a position parallel to the face of the arm 4 and between upstanding walls or flanges 7, 7 running along the sides of the arm 4. By means of this combination, the tension on the arms 2, 3, and 4 may be adjusted so that the arms may move freely with respect to each other and with respect to the triangular base member 1 or it may be adjusted easily and quickly to be tight enough to hold the arms firmly in a predetermined position.

The locking of the arm 4 to the bolt 5 by means of the hexagonal opening through the arm and the short hexagonal section of the bolt 5 combined with the locking of the nut 9 to the arm 4 by means of a spring clip 10 prevents the nut 9 from unscrewing from the bolt 5 with the movement of the arms with respect to the base. This makes possible an adjustment of the tension on the arms by the adjustment of the position of the nut 9 which remains fixed until such time as the user of the instrument desires to change it by raising the spring clip 10 and readjusting the position of the nut 9.

The arm 3 is provided with an inwardly projecting member 11 adapted to ride along a portion of the face of the triangular base 1 which does not bear an engraved scale. This projection avoids obliteration of the scales on the face of the triangular member by repeated adjustments of the arm 3. The arm 2 is provided with a hole through which the inward projection 11 can be extended when the arm 3 is superimposed on the arm 2. When the arms are superimposed in this manner the inward projection 11 engages the arm 2 so that the arms 2 and 3 can be swung in unison and the arm 2 maintained in a position such that it does not interfere with the use of the arm 3. The inward face of the arm 4 is similarly provided with an inwardly projecting member 12 adapted to ride along a portion of the triangular member 1 which does not bear an engraved scale. This projection like the projection 11 avoids obliteration of the scale by repeated adjustments of the arm.

The arms 3 and 4 are each provided with two windows 14, 14 and 15, 15. The windows 14, 14 and 15, 15 are each shaped in such a manner as to provide a pointer 16, 16, 16, 16 which is at the center which are adapted to read the scales appearing on the base triangle 1. The side of the instrument shown in Figure 1, adapted for the cutting of common rafters, carries a scale 17 which forms a segment of a circle having the center of the nut 5 as a radius. This scale comprises three sets of figures. The lower line of figures labeled "pitch" on Figure 1 is a designation of the pitch of the roof to be built in terms of inches of rise for each 12 inches of run. The upper two lines of figures give the length of a common rafter in terms of inches and sixteenths of an inch for each foot of run of a roof having a pitch designated by the figure shown on the lower scale. The scale labeled 18 is a continuation of the scale 17 for the cutting of rafters for a roof having an angular pitch of more than 45 degrees or 12 inches of rise to 12 inches of run.

The use of my improved instrument for the cutting of common rafters in connection with scale 17 will be explained with particular reference to Figure 4. For the purposes of illustration, the cutting of a rafter for a roof having a pitch of 5 or 5 inches of rise to 12 inches of run is selected. In cutting a rafter for a roof of this pitch, the pointer 16 on an arm 3 is set opposite the numeral 5 on the lower line of scale 17 and locked into place by means of the hexagonal nut 9 and the spring clip 10. In carrying out this operation, the arm 3 is superimposed on the arm 2 so that the arm 2 does not interfere with the operation. When this is done, the numerals 5 and 13 can be seen through the window 15 as shown by the instruments A and B illustrated in Figure 4. In Figure 4, instrument A is illustrated in position to allow the scribing of the plumb cut of the rafter 20 at the peak of the roof. The instrument B is shown in position for scribing the plumb and level cuts for notching the rafter to position it on the plate of the frame of the building. The number 13 showing through the window 15 means that the rafter must be 13 inches in length for each 12 inches of horizontal run of the roof.

For the cutting of rafters for a roof having a pitch greater than 12, the arm 3 is positioned so that the pointer 16 of window 14 is on the desired pitch shown on scale 18. The instrument is used in an exactly reversed position for each of the scribe cuts, as compared with the position in which it is used in connection with a roof having a pitch of less than 12.

The scale 19 utilized in conjunction with the pointer 16 of window 14 in the arm 3 is used for making hexagon, octagon, decagon, dodecagon cuts as illustrated by Figure 7 in which my improved instrument is shown in use for making octagon cuts on a timber 13. In making an octagon cut the arm 4 is positioned with the pointer 16 of window 14 on the graduation of scale 19 marked "Oct."

Referring to Figure 2, the scale 30 is for use in the cutting of and determination of the length of hip and valley rafters for a roof of any given pitch. The lower line of figures on the scale 30 designates the pitch of the roof while the upper two lines give the length of the hip or valley rafter in inches and sixteenths of an inch, respectively. The use of the instrument in connection with this scale in the cutting of hip and valley rafters is exactly parallel to that of scale 17 shown in Figure 1 when used in connection with the cutting of common rafters.

The scale designated 31 shown on Figure 2 is given in degrees and is used in conjunction with pointer 16 of window 14. The number which shows at the end of the pointer 16 of window 14 is the angle in degrees between the edge of the arm 4 and the edge 32 of the triangular base member 1.

The arm 4 is provided with a pointer 33 at its free end, which is adapted to register on the scale 34 engraved on the face of the base member 1. The figures of scale 34 are in terms of the pitch of the common rafters of a roof in terms of inches of use to inches of run while the actual placement of the graduations designated by these figures is such that a setting of the pointer 33 on the figure designating the pitch being utilized for the common rafters gives the correct angle for the cutting of hip and valley rafters used in the roof.

Referring again to Figure 1, the arm 3 is provided with a pointer 35, which is adapted to register with the scale 36 engraved on the face of the base member 1. The figures of scale 36 are in terms of the pitch of the common rafters of a roof in terms of inches of use to inches of run, while the actual placement of the graduations designated by these figures is such that a setting of the pointer 35 on the figure designating the pitch being utilized for the common rafters gives the proper angle of cut for use in cutting any jack rafters utilized in the roof.

The scales 37, 37 engraved along edges of the base member 1 and are suitable measuring scales, such as, an inch scale graduated to one-eighth of an inch as illustrated in Figures 1 and 2. Associated with these scales are a series of holes 38, 38, 38, 38, 38 entirely through and positioned along the edge of the base member 1. The holes are positioned in respect to the edges of the arms 3 and 4 when the arms are locked in a position such that the outer side is along edge 32 of the triangular base member 1, so that the instrument can be used as a standardized thickness gauge, as illustrated in Figure 5. In using the instrument in this manner, arm 3 or 4 is locked in position along the edge 32 of the instrument. The inner edge of arm 3 is then placed along the edge of a timber 39 as shown in Figure 5 and the timber marked by placing a pencil or scribe in the suitably positioned hole 38 and then drawing the instrument along the timber.

The instrument may also be used as an adjustable scribing gauge as illustrated by Figure 6. As already described hereinbefore, the arm 2 is provided with a slot 6 which renders it adjustable as well as rotatable with respect to bolt 5. This arm is engraved with suitable measuring scales 39, 39 and has a hole 40 positioned at the zero end of the measuring scale. To utilize the instrument as an adjustable scribing gauge, the arm 2 is disengaged from the arm 3 by loosening the hexagonal nut 9 so that the inwardly projecting member 11 can clear the arm 2. The arm 2 is then positioned at right angles to the edge 32 of the base triangle 1 and with the end bearing the hole 40 extending outwardly from the edge 32 a desired distance as measured on the scale 39.

What I claim and desire to protect by Letters Patent is:

1. An instrument for determining angles and cuts of rafters and the like comprising a base triangle having graduated scales on each face thereof, arms pivotally mounted on each face of said base triangle, said arms having projections protruding inwardly therefrom so as to contact the face of said triangular base to prevent said arms from defacing graduations on said base triangle, one of said projections being adapted to engage a complementary arm for movement of said complementary arm therewith in certain positions, and to release said complementary arm in certain other positions for independent readings by each of said arms pointers on the extremities of said arms for registering with selected scales on a face of said base triangle, said pivoted arms being movable across the base triangle so as to be adjusted to a predetermined position with respect to a scale and means for holding said arms in adjusted positions.

2. An instrument for determining angles and cuts for rafters and the like comprising a base triangle having graduated scales on each face thereof, a pair of superposed arms pivoted near a corner of said base triangle which corner is less than 90 degrees and a window formed in each of said arms in position to register with each other when in one position and to register with certain of said scales on said base triangle so as to determine the angles of cuts and the length of said rafter, an in-turned projection on the upper-most of said arms adapted to register with a hole formed in the inner-most of said arms so when engaged therewith, will cause both arms to move in unison, and when disengaged will permit each of the arms to move independently of each other for determining independent readings.

WILLIAM D. SMITHSON.

REFERENCES CITED

The following references are of record in the file of this patent:

UNITED STATES PATENTS

| Number | Name | Date |
|---|---|---|
| 450,823 | Fuller | Apr. 21, 1891 |
| 776,325 | Hodge | Nov. 29, 1904 |
| 1,105,763 | Edwards | Aug. 4, 1914 |
| 1,128,673 | Foner | Feb. 16, 1915 |
| 1,159,483 | Ernest | Nov. 9, 1915 |
| 1,346,050 | Nicholson | July 6, 1920 |
| 1,584,839 | Cameron | May 18, 1926 |
| 1,652,920 | Glass | Dec. 13, 1927 |
| 1,755,152 | Parker | Apr. 15, 1930 |
| 1,836,407 | Stover | Dec. 15, 1931 |
| 1,947,448 | Ahola | Feb. 20, 1934 |
| 2,183,446 | Davis | Dec. 12, 1939 |
| 2,395,234 | Schlueter | Feb. 19, 1946 |